United States Patent Office 3,702,802
Patented Nov. 14, 1972

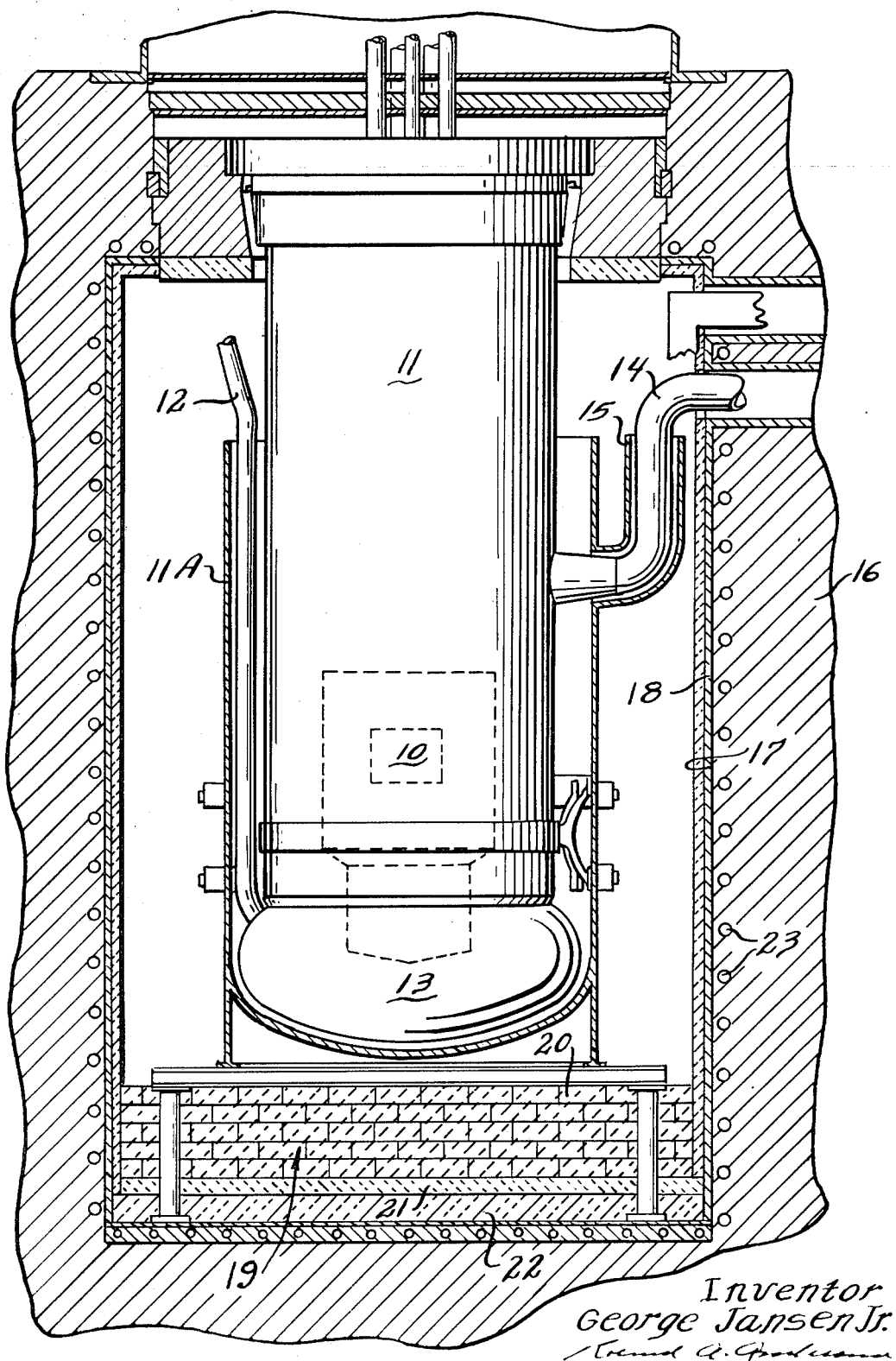

3,702,802
NUCLEAR REACTOR INCORPORATING MEANS
FOR PREVENTING MOLTEN FUEL FROM
BREACHING THE CONTAINMENT VESSEL
THEREOF IN THE EVENT OF A CORE MELT-
DOWN
George Jansen, Jr., Kennewick, Wash., assignor to the
United States of America as represented by the United
States Atomic Energy Commission
Filed June 16, 1971, Ser. No. 153,654
Int. Cl. G21c 9/00
U.S. Cl. 176—38                                    7 Claims

ABSTRACT OF THE DISCLOSURE

A ceramic oxide eutectic with a relatively low melting point which will dissolve nuclear reactor fuel is employed as a barrier material to prevent molten fuel from breaching the containment vessel surrounding a nuclear reactor in the event of a core meltdown. The ceramic oxide eutectic—preferably basalt or other $SiO_2$-$Al_2O_3$ material used in the form of brick, block, or gravel—rests on a layer of depleted uranium dioxide and a layer of fire brick which insulates a cooled steel containment vessel from the basalt. In the extremely unlikely event of an accident to a fast reactor causing a gross core meltdown, the molten mass of fuel will fall onto the basalt, melting the basalt and dissolving in the pool of molten basalt thus formed. The fuel is thereby dispersed over a large volume at a temperature sufficiently low that the reactor containment is not threatened.

CONTRACTURAL ORIGIN OF THE INVENTION

The invention described herein was made in the course of, or under, a contract with the United States Atomic Energy Commission.

BACKGROUND OF THE INVENTION

This invention relates to means for preventing radioactivity from escaping to the environment from a nuclear reactor in which a gross core meltdown occurs. In more detail, the invention relates to the use of a new barrier material which will prevent molten fuel from breaching core containment in the event of a core meltdown. In still more detail, the invention relates to a liquid-metal-cooled fast reactor which is surrounded by a containment vessel wherein is disposed a new barrier material as a floor under the core of the reactor. With modifications, this concept could be applied to water-cooled thermal reactors also, but the melt-through accident is not as likely to happen.

It is postulated that under certain conditions an accident to a fast nuclear reactor could occur which would result in a gross core meltdown. Since the temperature of such a mass of molten fuel could rise to as high as 3200° C., conceivably the molten fuel could slump to the bottom of the primary reactor vessel, melt through the vessel, fall to the floor of the reactor pit, melt through the floor, and through the bottom of the containment vessel, thereby releasing radioactive fission products to the environment. While the possibility of such an accident is extremely remote, the potential consequences are so serious that precautions should be taken which will make a radioactive release completely impossible. Obviously, some sort of barrier must be presented to the molten fuel which will prevent it from reaching the containment vessel. It is possible that a barrier could be provided within the reactor vessel that would positively prevent rupture of the primary containment vessel and such would obviously be desirable if possible. It is by no means certain that such a barrier can be provided, wherefore various suggestions have been made for barriers located outside the reactor vessel but within the secondary containment vessel. For example, a water-cooled crucible has been considered for installation beneath the primary vessel of a pressurized-water reactor. The molten mass of fuel would be cooled before it could penetrate the secondary containment vessel. It has also been suggested that a pan with a large heat transfer area could be installed below the reactor vessel of a fast reactor and cooled by sodium by natural convection. Another suggestion is that a high melting barrier formed of unenriched uranium dioxide, for example, could be disposed in the reactor pit below the reactor vessel. The rate of penetration of the uranium dioxide barrier would be very low, since its melting temperature is high and the molten fuel would tend to float on top of the melted layer of the barrier because of the higher temperature and dissolved lighter elements in the fuel. Assuming that the heat generated by the fission products is removed from the secondary containment vessel by a containment cooling system, it should be possible to detain the molten mass sufficiently long that penetration of the containment vessel can be precluded. Due to the concentrated nature of the fuel mass, however, an extensive and expensive cooling system would be required.

SUMMARY OF THE INVENTION

According to the present invention, a ceramic oxide eutectic with a relatively low melting point such as basalt or other $SiO_2$-$Al_2O_3$ material is employed as a barrier material below a fast reactor core. Specifically, the floor of the pit containing the reactor is composed of a three-foot layer of basalt bricks separated from a steel secondary containment vessel by a six-inch pad of depleted uranium dioxide and a foot of thermal insulation. Cooling tubes are embedded in a six-inch layer of concrete surrounding tthe steel containment vessel. The purpose of the basalt is to provide a fluxing material to lower the melting temperature of the reactor fuel.

SPECIFIC EMBODIMENT OF THE INVENTION

The invention will next be described in connection with the accompanying drawing wherein the single figure is a diagrammatic vertical sectional view of a nuclear reactor including the secondary containment structure therefor wherein the present invention resides. As shown in the drawing, the core 10 of a fast reactor is disposed within a primary reactor vessel 11—disposed within guard vessel 11A—having an inlet line 12 leading to an inlet plenum 13 and an outlet line 14 protected by a guard pipe 15. The reactor is surrounded by concrete shielding 16 defining a pit 17 containing the reactor and the pit is lined with a metal secondary containment vessel 18. Further details of the reactor will not be given since they form no part of the present invention.

According to the present invention, the bottom of the reactor pit 17 contains a floor 19 consisting of a three-foot-thick layer 20 of basalt block or brick resting on a six-inch-thick pad 21 of depleted uranium dioxide with a one-foot-thick layer of magnesium oxide 22 between the uranium dioxide and the bottom of containment vessel 18. A typical basalt which would be useful has the following composition in weight percent: 50.0 $SiO_2$, 13.4 $Al_2O_3$, 11.7 FeO, 10.3 CaO, 7.0 MgO, 2.3 $Na_2O$. Coolant tubes 23 maintained at 66° C. are buried in a layer of concrete immediately surrounding containment vessel 18 at a distance of about 6 inches.

It will be appreciated, of course, that the suggested materials merely represent a preferred embodiment and other similar materials may be used. For example, any ceramic oxide eutectic having a relatively low melting point in which the fuel is soluble may be used. Other properties the melt should have are low viscosity (for adequate mixing and high heat transfer coefficients from pool to pool boundary) and the ability to dissolve the fuel rapidly (apart from the equilibrium solubility of the fuel). One other composition which would be useful contains 60 mol percent silica, 25 mol percent calcia and 15 mol percent alumina and melts at 1170° C. and solidifies to form a glass that is relatively insoluble in water. The solubility of uranium dioxide in this mixture is estimated to be 8 wt. percent and the heat generating rare earth oxides are soluble far in excess of their presence in the system. Inclusion of sodium oxide in the system would lower the melting point and increase the solubility of uranium dioxide in the melt.

Interlocking blocks or bricks of basalt or other ceramic are theoretically preferable to basalt sand, gravel or loose brick which might float on the dense molten fuel before the basalt melts and dissolves the core. However, since interlocking basalt bricks are difficult to acquire and the period during which the density of the molten core-basalt pool is high enough to float basalt is quite short, this is an optional feature which may not in fact be used. While it might appear that concrete made from a basaltic sand or aggregate could also be used, this is not the case due to the water present therein. Because of this water, concrete would spall explosively and crack when contacted with molten fuel. In addition, the reaction of bound and free water from concrete with the molten core might produce hydrogen in amounts which could pressurize the system to levels in excess of design ratings and produce explosive concentrations in the containment vessel atmosphere. In fact, it may even be necessary to recrystallize naturally occurring basalt before it is used due to the presence of about 2 percent volatiles (probably water) in natural basalt. However, this is not yet fully established.

Rather than unenriched uranium dioxide, layer 21 may be formed of any fire brick having a suitably high melting point. Other possible materials include MgO, alumina, silica, and even $Al_2O_3 \cdot SiO_2$ without other melting point lowering additives. Uranium dioxide is particularly suitable because it has a melting point and specific gravity similar to the proposed uranium dioxide fuel. Minimum penetration is assured in view of the advantages associated with the use of uranium dioxide as a barrier material discussed above. Similarly the thermal insulation can be magnesia and the containment vessel can be ⅜ to ¾ inch steel.

In general it is evident that progressive grading of materials away from the top of the floor and toward the sides of the floor to the reactor pit so that a progressively higher melting point is encountered and a natural crucible-like cavity is formed will tend to reduce penetration.

According to the present invention, in the unlikely event of a core meltdown, the molten core will fall onto the above-described floor to the reactor pit, melting the basalt brick and dissolving in the molten pool of basalt thus formed, thereby being dispersed over a large volume. Once the heat generating rare earth oxides are dissolved, they tend to stay dispersed in the molten mass as it cools.

This dilution serves to lower the maximum temperature reached in the system by two effects: (1) the fuel temperature is reduced to the melting point of the basalt through the absorption of generated heat into the latent heat of fusion of a large body of material from which it will later be released more slowly and (2) the effective available surface area of the pool for heat transfer by radiation and convection to the reactor cavity and heat conduction into the ground is increased.

Preliminary calculations show that the pool reaches a maximum temperature of 1420° C. at 65 hours and the steel containment vessel will reach a maximum temperature of 172° C. at 225 hours, assuming a four-foot layer of basaltic brick, a four-foot layer of fire brick and cooling pipes maintained at 66° C. embedded in structural concrete about 9 inches below the containment vessel. When a hemispherical pool has grown to a depth of about 5 feet, fuel from a 500 MWt core will be fully dissolved in the basalt. The temperature of the mixture would be about 1200° C., this temperature gradually increasing to about 1420° C. as above mentioned.

The purpose of the cooling pipes 22, of course, is to prevent the pool containing the molten fuel from growing so large as to endanger the containment vessel. These could be eliminated if the containment vessel could be made larger.

During the pool formation process, a multiphase region composed of melt and unmelted solids is formed at the side and lower boundary of the pool. This multiphase region behaves as a "frozen wall" to prevent deep local penetration of fuel and fission products ahead of the melting pool, which will tend to carve out a roughly hemispherical cavity in the basalt. A grading of materials to higher melting points away from the floor top will also tend to reduce penetration and this constitutes a part of the present invention. After the pool begins to shrink slowly because of a decrease in decay heating, the bulk of the fission products, being present in trace quantities, will remain in the melt. Thus an increasingly thick wall of hard-to-penetrate, insoluble glass shields the environment from the accidental leaking of radioactivity. Eventually, the fission products are retained in solid form near the center of the frozen pool.

The embodiments of the invention in which an exclusive property or privilege is claimed are defined as follows:

1. In a liquid-metal-cooled nuclear reactor incorporating a core disposed within a secondary containment vessel, the improvement comprising a barrier materital for reducing the downward movement of fuel following a core meltdown consisting of a layer of a ceramic oxide eutectic which has a low viscosity and is capable of dissolving the fuel resting on a pad formed of a high melting material selected from the group consisting of depleted uranium dioxide, MgO, alumina, silica and $Al_2O_3 \cdot SiO_2$ disposed below the core within the secondary containment vessel.

2. The improvement of claim 1 wherein the ceramic oxide eutectic is a basalt.

3. The improvement of claim 2 wherein the basalt is in the form of brick or block and has the following composition in weight percent: 50.0 $SiO_2$, 13.4 $Al_2O_3$, 11.7 FeO, 10.3 CaO, 7.0 MgO, 2.3 $Na_2O$.

4. The improvement of claim 3 wherein the block or brick are interlocking.

5. The improvement of claim 4 wherein cooling tubes are provided in a layer of concrete adjacent to and outside of the secondary containment vessel.

6. The improvement of claim 1 wherein the ceramic oxide is graded to higher melting points away from the top and toward the sides of the layer of ceramic oxide eutectic.

7. The improvement of claim 1 wherein the barrier consists of three feet of basalt brick or block over six inches of unenriched uranium dioxide with 12 inches of thermal insulation between the barrier and the containment vessel and cooling tubes are disposed six inches outside of the secondary containment vessel in a layer of concrete.

References Cited

UNITED STATES PATENTS 3,607,630   9/1971   West et al. _____ 176—38

OTHER REFERENCES

Transactions of A.N.S., vol. 13, No. 1, p. 376, Jansen et al., June 26, 1970.

Transactions of A.N.S., vol. 13, No. 2, pp. 720, 721, by Fontana, Nov. 13, 1970.

Nuclear Applications, vol. 5, August 1968, pp. 53, 54, by Zivi.

CARL D. QUARFORTH, Primary Examiner

H. E. BEHREND, Assistant Examiner

U.S. Cl. X.R.

176—87